US005817165A

United States Patent [19]
Hachisuka et al.

[11] Patent Number: 5,817,165
[45] Date of Patent: Oct. 6, 1998

[54] FLUORINE-CONTAINING POLYIMIDE GAS SEPARATION MEMBRANE AND METHOD OF MANUFACTURING THE SAME

[75] Inventors: Hisao Hachisuka, Kyoto; Masatoshi Maeda, Osaka; Kenichi Ikeda, Shiga, all of Japan

[73] Assignee: Nitto Denko Corporation, Osaka, Japan

[21] Appl. No.: 663,509

[22] Filed: Jun. 13, 1996

[30] Foreign Application Priority Data

Jun. 15, 1995 [JP] Japan ................................. 7-149240
Jun. 15, 1995 [JP] Japan ................................. 7-149241
Jun. 15, 1995 [JP] Japan ................................. 7-149242

[51] Int. Cl.$^6$ ................................................. B01D 53/22
[52] U.S. Cl. ............................. 96/4; 96/8; 96/13; 96/14; 55/524; 55/DIG. 5
[58] Field of Search .................... 95/45, 51, 54; 96/4, 13, 14; 55/524, DIG. 5

[56] References Cited

U.S. PATENT DOCUMENTS

| Re. 30,351 | 7/1980 | Hoehn et al. ................................. 95/54 |
| 3,754,375 | 8/1973 | Bouchilloux et al. .................... 96/13 X |
| 3,822,202 | 7/1974 | Hoehn ........................................ 96/4 X |
| 4,474,858 | 10/1984 | Makino et al. ........................... 96/13 X |
| 4,528,004 | 7/1985 | Makino et al. ............................... 96/13 |
| 4,705,540 | 11/1987 | Hayes ......................................... 95/51 |
| 4,717,393 | 1/1988 | Hayes ......................................... 95/51 |
| 4,717,394 | 1/1988 | Hayes ......................................... 55/16 |
| 4,732,586 | 3/1988 | Dick et al. ................................... 96/14 |
| 4,746,474 | 5/1988 | Kohn ........................................ 96/14 X |
| 4,838,900 | 6/1989 | Hayes ......................................... 95/54 |
| 4,880,441 | 11/1989 | Kesting et al. ............................... 55/16 |
| 4,880,442 | 11/1989 | Hayes ......................................... 95/51 |
| 4,929,405 | 5/1990 | Kohn ......................................... 264/41 |
| 4,932,982 | 6/1990 | Hayes ......................................... 95/51 |
| 4,932,983 | 6/1990 | Hayes ......................................... 95/51 |
| 4,948,400 | 8/1990 | Yamada et al. ........................... 96/14 X |

(List continued on next page.)

FOREIGN PATENT DOCUMENTS

| 0410793 | 1/1991 | European Pat. Off. .................. 95/51 |
| 0 509 260 | 10/1992 | European Pat. Off. . |
| 5-007749 | 1/1993 | Japan ......................................... 95/45 |
| 2 282 818 | 4/1995 | United Kingdom . |
| WO94/29002 | 12/1994 | WIPO ........................................ 95/45 |

OTHER PUBLICATIONS

Matsumoto, et al., "Gas Permeation of Aromatic Polyimides. I. Relationship Between Gas Permeabilities and Dielectric Constants", *Journal of Membrane Science*, vol. 81, Nos. 1/2, Jun. 1993, pp. 15–22.

Glatz, et al., "Gas Permeabilities and Perselectivities of Amorphous Segmented 6F Poly(arylene thioether imide)s and the Corresponding Poly)arylene sultone imide)s", *Journal of Membrane Science*, vol. 90, Nos. 1/2, Apr. 1994, pp. 151–159.

*Primary Examiner*—Robert Spitzer
*Attorney, Agent, or Firm*—Merchant, Gould, Smith, Edell, Welter & Schmidt, P.A.

[57] ABSTRACT

A fluorine-containing polyimide gas separation membrane which is pinhole-free, uniform over a large area, and has a high permeability and a high separation factor α is provided. A polyimide resin is dissolved in at least one solvent selected from the group consisting of an organic solvent (A) or (B). The organic solvent (A) has a dielectric constant of 30 or less and a dipole moment of 3.0 D or less. The organic solvent (B) mainly contains an organic solvent having at least one ether bonding in the molecular unit. In the next step, the polyimide resin is dipped in a solvent (C) in order for desolvation. The solvent (C) does not dissolve the fluorine-containing polyimide resin while it is miscible with the organic solvent (A) or (B). As a result, an asymmetric gas separation membrane is formed. The fluorine-containing polyimide resin layer comprises a skin layer the thickness $L_1$ thereof is about 40 nm and a sponge like layer the thickness $L_2$ thereof is about 30 μm. The membrane is formed on a supporter of, for example, a nonwoven cloth.

18 Claims, 4 Drawing Sheets

U.S. PATENT DOCUMENTS

| | | | |
|---|---|---|---|
| 4,955,993 | 9/1990 | Sanders, Jr. et al. | 95/54 |
| 4,964,887 | 10/1990 | Shimatani et al. | 95/51 |
| 5,042,992 | 8/1991 | Blinka et al. | 95/51 |
| 5,055,116 | 10/1991 | Kohn et al. | 95/51 X |
| 5,067,970 | 11/1991 | Wang et al. | 96/13 X |
| 5,071,452 | 12/1991 | Avrillon et al. | 95/51 X |
| 5,074,891 | 12/1991 | Kohn et al. | 95/51 X |
| 5,076,816 | 12/1991 | Avrillon et al. | 95/51 |
| 5,085,676 | 2/1992 | Ekiner et al. | 96/13 |
| 5,160,353 | 11/1992 | Gochanour | 96/13 X |
| 5,163,977 | 11/1992 | Jensvold et al. | 95/45 |
| 5,165,963 | 11/1992 | Matsumoto et al. | 95/51 X |
| 5,178,650 | 1/1993 | Hayes | 95/51 X |
| 5,178,940 | 1/1993 | Matsumoto et al. | 96/13 |
| 5,232,472 | 8/1993 | Simmons et al. | 96/14 |
| 5,234,471 | 8/1993 | Weinberg | 95/51 X |
| 5,286,280 | 2/1994 | Chiou | 95/45 |
| 5,320,650 | 6/1994 | Simmons | 96/14 |
| 5,322,549 | 6/1994 | Hayes | 95/45 |
| 5,591,250 | 1/1997 | Stern et al. | 95/51 |

FLUORINE-CONTAINING POLYIMIDE GAS SEPARATION MEMBRANE AND METHOD OF MANUFACTURING THE SAME

FIELD OF THE INVENTION

This invention relates to a fluorine-containing polyimide gas separation membrane and method of manufacturing the same. The membrane is uniform over a large area and also has a high permeability and a high separation factor α. More specifically, this invention relates to a method of manufacturing such a fluorine-containing polyimide gas separation membrane used for gas separation in a wet phase transversion method where a specified solvent is used. Namely, this invention relates to an asymmetric fluorine-containing polyimide gas separation membrane used as an asymmetric membrane or a composite membrane for separation or concentration of specified components from a mixture of gases for industrial use. The specified components include, for example, hydrogen, methane, carbon dioxide, oxygen, nitrogen and water vapor.

BACKGROUND OF THE INVENTION

Polyimide is known as a gas separation membrane material with excellent heat-resisting and anti-chemical properties due to its high glass transition point and rigid molecular chain structure. Therefore, separation membranes of various polyimides have been examined. For example, U.S. Pat. No. 4,378,400 and U.S. Pat. No. 4,959,151 disclose aromatic polyimide using biphenyl tetracarboxylic dianhydride. Fluorine-containing aromatic polyimide is disclosed in Published Unexamined (Kokai) Japanese Patent Application No. Hei 5-7749, and U.S. Pat. Nos. 3,822,202, 3,899,309, 4,532, 041, 4,645,824, 4,705,540, 4,717,393, 4,717,394, 4,838,900, 4,897,092, 4,932,982, 4,929,405, 4,981,497, and 5,042,992.

Moreover, U.S. Pat. No. 4,964,887 and U.S. Pat. No. 4,988,371 disclose polyimides using aliphatic or alicyclic tetracarboxylic dianhydride.

The manufacture of a thinner and more asymmetric separation membrane having a mechanical strength suitable for practical usage has been considered. When a polymer having a high separation factor is formed as a membrane on a proper porous supporting film, the membrane preferably should be 0.1 μm thick or less to obtain a practical permeability. As a result, the manufacturing process becomes complicated, the yield deteriorates and the cost is raised, and thus it is impractical for industrial use. Though processes to manufacture asymmetric membranes are also disclosed in the above documents, it is difficult to industrially manufacture a pinhole-free membrane of 0.1 μm thick or less. U.S. Pat. No. 4,929,405 discloses a method to control the thickness of a fluorine-containing aromatic polyimide uniform membrane to be 40 nm or less. This value is smaller than the required limitation of 0.1 μm. However, the membrane does not have the mechanical strength necessary for a practical use, since it has no supporting layer. Therefore, it cannot be manufactured on an industrial scale.

Published Unexamined (Kokai) Japanese Patent Application Nos. Hei 5-049882 and Hei 5-146651 disclose post-treatment and No. Hei 5-184887 discloses pretreatment. U.S. Pat. No. 4,902,422 and U.S. Pat. No. 5,085,676 disclose improvement of the manufacturing process. The purpose is forming a pinhole-free asymmetric membrane.

However, such methods have problems like complicated procedures, high cost and difficulty in stable manufacturing on an industrial scale.

The above-mentioned conventional techniques cannot provide a satisfactory method to manufacture a polyimide separation membrane at a practical industrial level and to conduct an effective separation. More specifically, pin holes are formed during the manufacturing process. The ability of the separation membrane is decreased and unstabilized due to the pin holes, and thus, the separation cannot be carried out effectively. Secondly, the manufacturing process becomes complicated and the cost is raised to compensate the first problem. In addition, the manufacturing condition is difficult to control to reduce the pin holes. As a result, it is impossible to manufacture a membrane that has separation ability and permeability in a good balance.

SUMMARY OF THE INVENTION

In order to solve these and other problems of conventional techniques, this invention aims to provide a fluorine-containing polyimide gas separation membrane having a high permeability and a high separation factor α. Such a membrane is pinhole-free and uniform over a large area. This invention also provides a simple method for manufacturing a highly permeable gas separation membrane that is satisfactory in cost efficiency.

In order to achieve such aims, a fluorine-containing polyimide gas separation membrane of this invention is a gas separation membrane of at least 0.5 $m^2$ which has at least a sponge like layer of solvent soluble fluorine-containing polyimide resin and a skin layer formed thereon. The average thickness of the skin layer is from 1 to 100 nm, and the permeability of $CO_2$ gas is from 0.01 to 50 $Nm^3/m^2/h/atm$. The separation factor α of $CO_2$/methane is from 2 to 60. Accordingly, a pinhole-free fluorine-containing polyimide gas separation membrane having a high permeability and a high separation factor α can be provided.

This invention also provides a method of manufacturing such a fluorine-containing polyimide gas separation membrane having at least a sponge like layer of solvent-soluble fluorine-containing polyimide resin and a skin layer formed thereon. The method comprises the following steps:

dissolving a polyimide resin in at least one solvent selected from the group consisting of an organic solvent (A) where the dielectric constant is at most 30 and the dipole moment is at most 3.0 D, and an organic solvent (B) whose main component (at least 50 weight %) is an organic solvent having at least one ether bonding group in its molecular unit;

conducting desolvation by dipping the polyimide resin in a solvent (C) which is miscible with the organic solvent (A) or (B) while not dissolving the fluorine-containing polyimide resin. According to this method, a gas separation membrane that is high in permeability and satisfactory in cost efficiency can be manufactured in a simple manner.

It is preferable that the gas separation membrane is at least one membrane selected from the group consisting of a tubular membrane, a hollow membrane, and a membrane formed on a permeable supporter; such a gas separation membrane can be practically used as a module.

It is preferable that the solvent-soluble fluorine-containing polyimide resin is at least one resin selected from the group consisting of fluorine-containing polyimide resins having at least three fluorine atoms and at least one —$SO_2$— part in its repeating molecular unit of the polyimide resin layer. Such a gas separation membrane has a high gas separation ability.

It is preferable that the repeating molecular unit of the fluorine-containing polyimide resin has at least one —$CF_3$ group; such a resin has a high gas separation ability.

It is preferable that the fluorine-containing polyimide resin mainly includes a repeating unit of at least 50 weight % expressed as the Formula (1). In this formula, $A_1$–$A_n$ indicate at least one tetravalent organic group selected from the group consisting of aromatic, alicyclic and aliphatic hydrocarbon groups (cf. Formula (1-1)). $R_1$–$R_n$ indicate divalent aromatic, alicyclic or aliphatic hydrocarbon groups (cf. Formula (1-2)), or a divalent organic group where these hydrocarbon groups are bonded with a divalent organic bonding groups (cf. Formula (1-3)). At least one of the organic groups included in $A_1$–$A_n$ contains at least three fluorine atoms, and at least one organic group included in $R_1$–$R_n$ indicates one of the group consisting of —$SO_2$— bonding group, a divalent group bonded at the ortho or meta position, or at least two ether bonding groups.

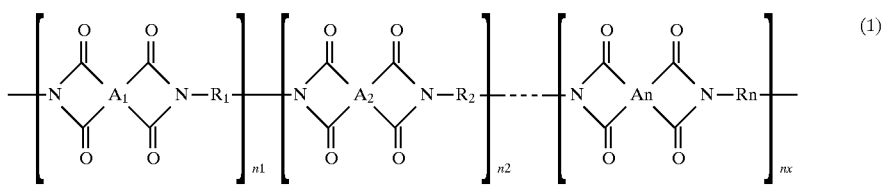

In this formula, n indicates the composition ratio of the repeating units, and $n+n_1+n_2 \ldots +n_x=1$.

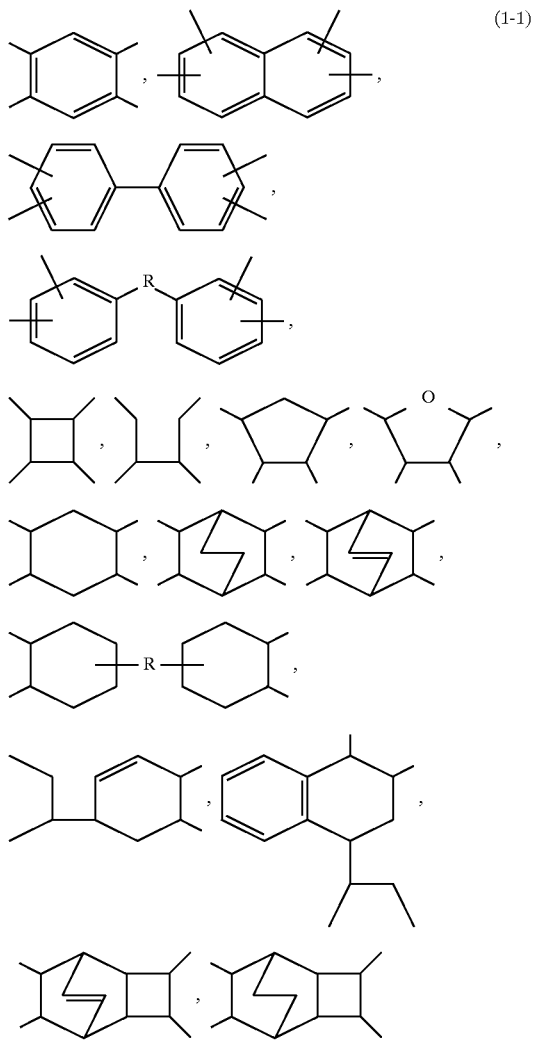

(1-1)

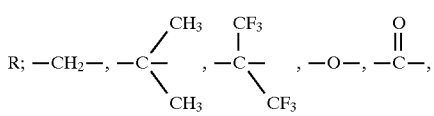

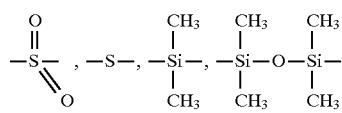

-continued

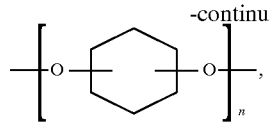

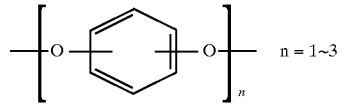

(1-2)

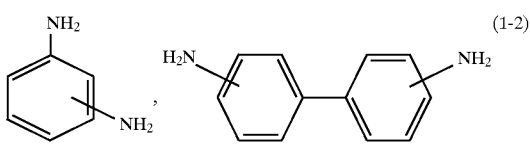

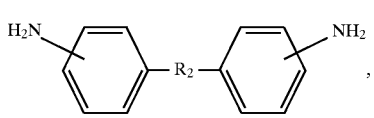

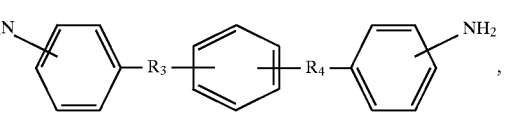

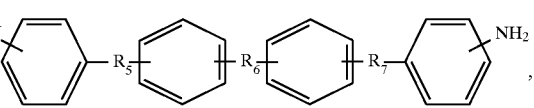

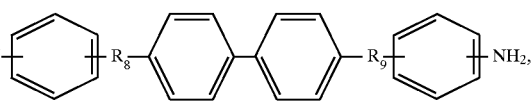

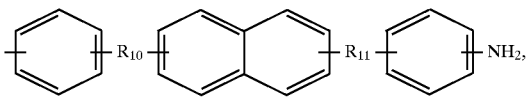

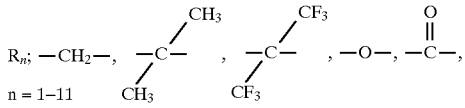

n = 1–11

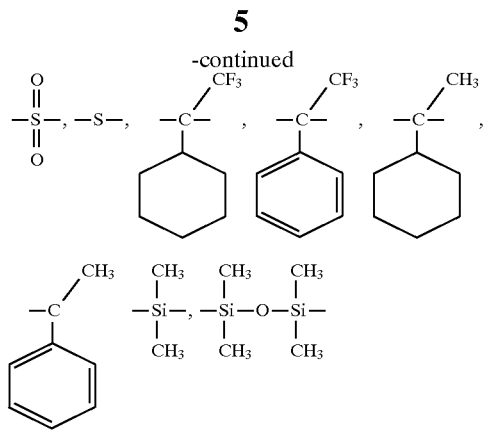
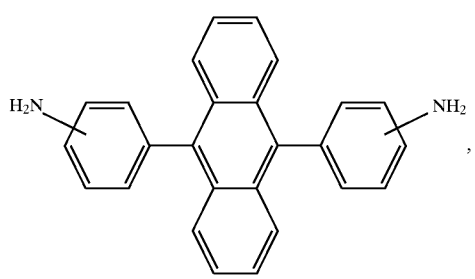
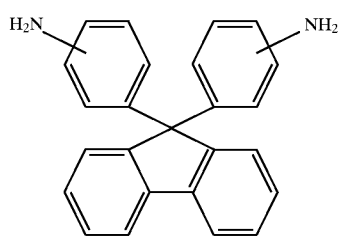
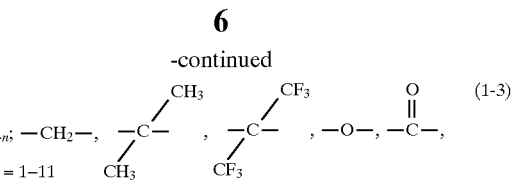
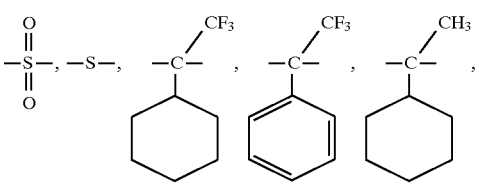
Such a resin has a high gas separation ability.
It is preferable that the fluorine-containing polyimide resin is mainly consisting of at least one repeating unit expressed as at least one formula selected from the group consisting of the following formulas from (2) to (8).
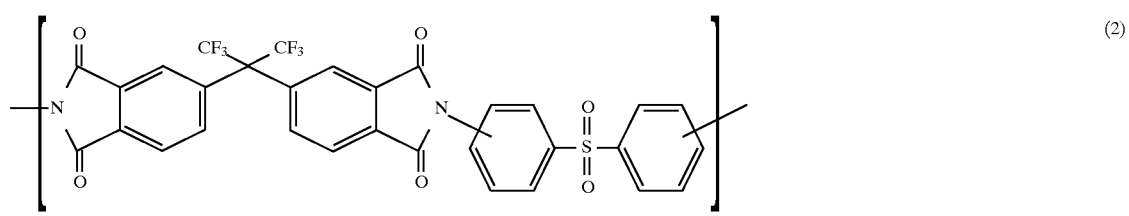
(2)
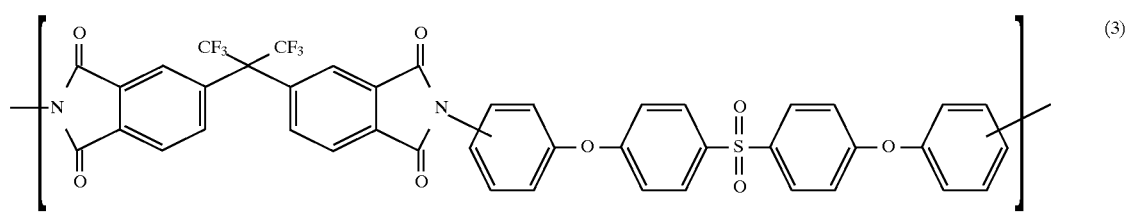
(3)
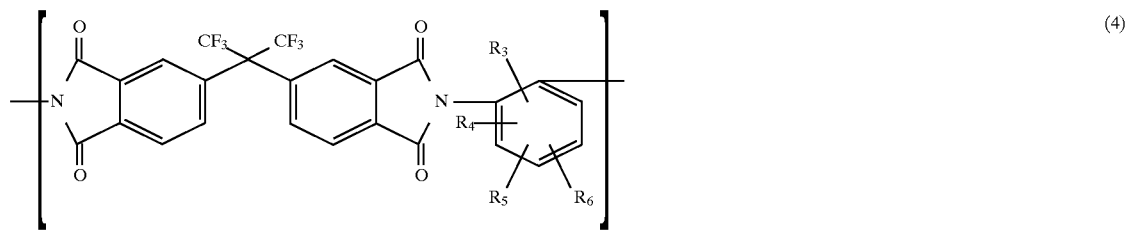
(4)

-continued

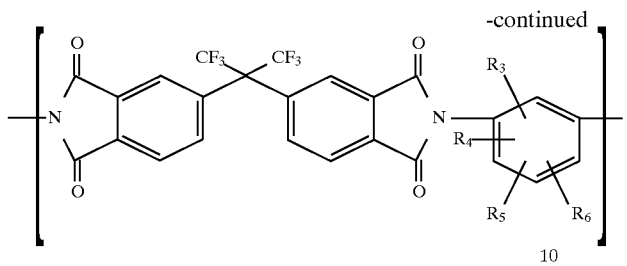

(5)

where $R_3$ to $R_6$ indicate hydrogen, hydrocarbon groups having from one to four carbons, halogen, hydroxyl groups, carboxylic acid groups, carboxylic acid ion groups, sulfonic groups, sulfonic ion groups, amino groups, nitrile groups, nitro groups or isocyanate groups.

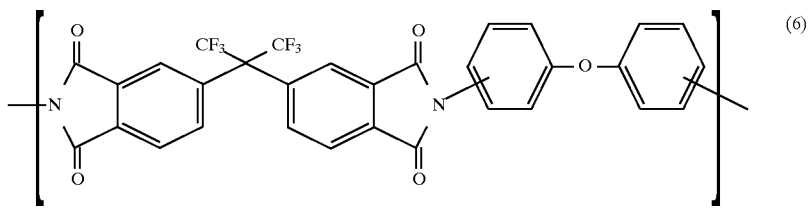

(6)

where the benzene ring is bonded at the ortho or meta position.

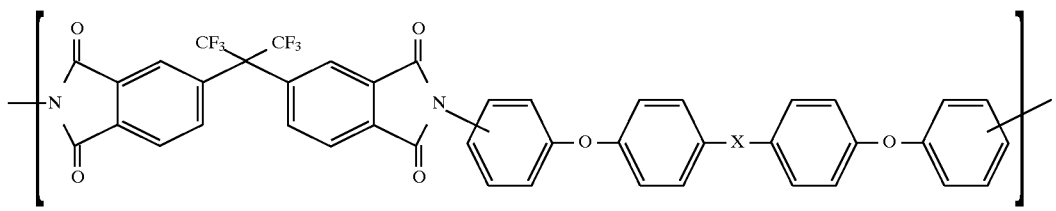

(7)

where X indicates:

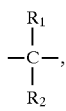

$R_1$ and $R_2$ represent hydrogen or hydrocarbon groups having from one to four carbons.

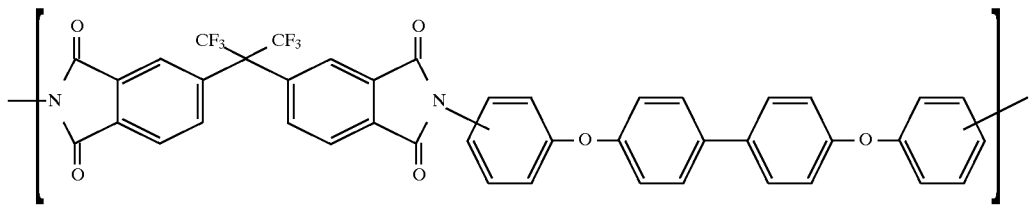

(8)

Such a resin also has a high gas separation ability.

It is preferable in the manufacturing method that the dielectric constant of the organic solvent (A) is at most 10 and the dipole moment is at most 3.0 D. Such a solvent has the property of being miscible with water gradually. When the polyimide resin is dissolved in the organic solvent (A) and cast to be a film, desolvation in water is conducted slowly. As a result, both the skin layer and the inner sponge like layer become uniform.

It is preferable that the main component of the organic solvent (A) or (B) is at least one solvent selected from the group consisting of diethylene glycol dimethyl ether, diethylene glycol diethyl ether, and a mixture of these materials.

With these solvents, desolvation is conducted in water slowly, so that both the skin layer and the inner sponge like layer become uniform.

It is preferable in the manufacturing method that the solvent (C) is at least one solution selected from the group consisting of water, alcohols and the mixture thereof. In such a case, both of the skin layer and the inner sponge like layer become uniform since desolvation is conducted slowly in the solution.

It is preferable that a protective film of elastomer polymer is further formed on the fluorine-containing polyimide gas separation membrane. Problems such as pin holes thus are further prevented.

It is preferable that the protective film of elastomer polymer is a crosslinked film of a crosslinked silicone resin. Problems like pin holes thus can be prevented.

It is preferable that the gas separation membrane of this invention has no void parts of over 1 μm in diameter. Problems can be reduced if the sponge like layer is uniform.

According to this invention, the flourine-containing polyimide gas separation membrane which is uniform over a large area and free from problems like pin holes can be provided. Such a membrane has a high permeability and a high separation factor α.

According to the manufacturing method of this invention, a fluorine-containing polyimide gas separation membrane which is excellent in permeability and satisfactory in cost efficiency can be manufactured in a simple manner.

The gas separation membrane module of this invention is a module using a gas separation membrane of at least 0.5 m² having at least a sponge like layer of solvent-soluble fluorine-containing polyimide resin and a skin layer formed thereon. The average thickness of the skin layer is from 1 to 100 nm, the permeability of $CO_2$ gas is from 0.01 to 50 $Nm^3/m^2/h/atm$, and the separation factor $\alpha$ of $CO_2$/methane is from 2 to 60. As a result, this invention provides a gas separation membrane module that is pinhole-free and uniform over a large area, and has a high permeability and a separation factor $\alpha$.

DETAILED DESCRIPTION OF THE INVENTION

Figure 1:
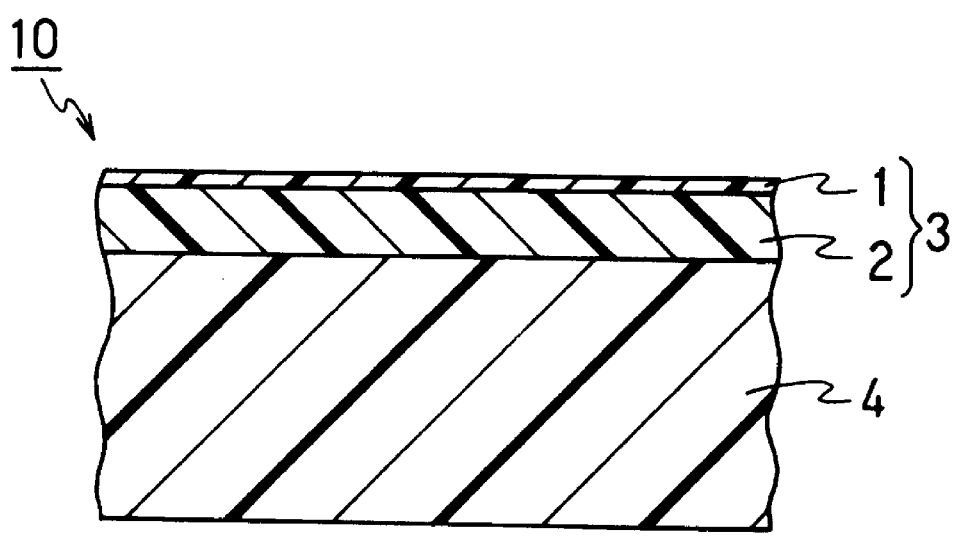
FIG. 1 is a schematic cross-sectional view of a flat type separation membrane coated on a supporter according to one embodiment of this invention.

This invention will be described by referring to some illustrative examples.

This invention provides a method of manufacturing an asymmetric membrane where the thickness of the uniform skin layer is maintained in a predetermined range by using a specified solvent for dope-forming in a wet phase transversion film-forming method, and pin holes are not formed over a large area. Pin holes greatly deteriorate the separation ability of the membrane. An asymmetric membrane is formed as a sponge like layer coated with a skin layer.

The flourine-containing polyimide resin layer used in this invention relates to the gas separation ability. It comprises fluorine-containing polyimide resin having at least three fluorine atoms and at least one —$SO_2$— part in the repeating molecular unit of the polyimide. It is preferable that the repeating molecular unit composing the polyimide resin layer comprises at least one —$CF_3$ group. It is further preferable that from 6 to 12 fluorine atoms are contained in the fluorine-containing polyimide membrane (in the repeating molecular unit). Thus, a substantially stable, high quality gas separation membrane can be obtained.

In Formula (1), the tetravalent organic groups having at least three fluorine atoms are not limited as long as a proton of the tetravalent group of either $A_1$ or $A_2$ is replaced by either a fluorine atom or a group having fluorine atom. However, it is further preferable that at least one proton of the tetravalent organic group is replaced by a —$CF_3$ group. For instance, it is preferable to use a tetravalent organic group shown in the following Formula (17).

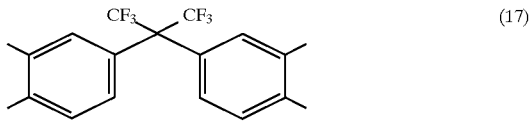

(17)

In Formula (1), the divalent group having at least one —$SO_2$— part is not limited as long as at least one of $R_1$ to $R_n$ has —$SO_2$— part. However, divalent groups expressed as the following formulas from (18) to (20) are used more preferably.

(18)

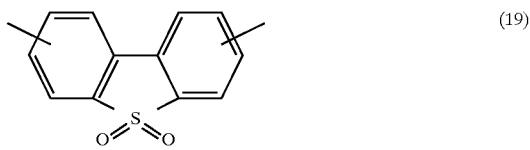

(19)

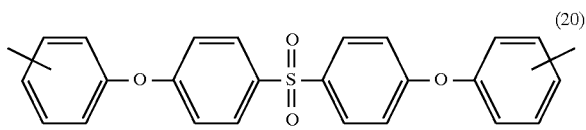

(20)

The fluorine-containing polyimide resin used in this invention preferably has a repeating molecular unit as a main component as shown in Formula (21) or (22).

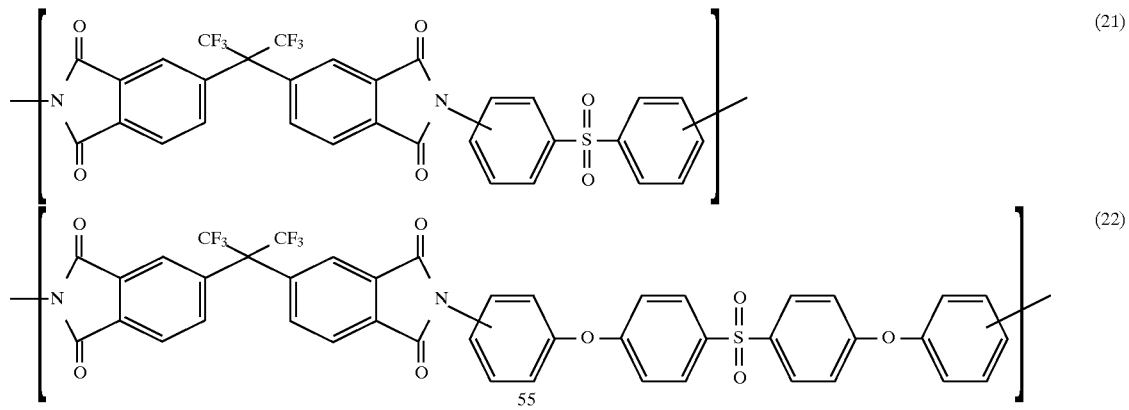

Fluorine-containing polyimide resin layer applied in this invention relates to the gas separation ability, and at least one proton of from $A_1$ to $A_n$ in Formula (1) is replaced by one —$CF_3$ group. For example, the tetravalent organic group expressed as the following formula is preferably used.

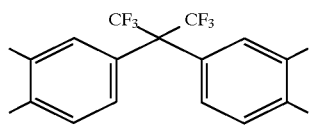 (23)

There is no limitation about a divalent organic group ($R_1$ or $R_2$) that is not bonded at a para position. Namely, the organic group is at ortho or meta position. More preferably, however, divalent organic groups expressed as the following Formulas (24)–(26) are used. $R_3$–$R_6$ in Formulas (24) and (25) are hydrogen, hydrocarbon groups having from one to four carbons, halogen, hydroxyl groups, carboxylic acid groups, carboxylic acid ion groups, sulfonic ion groups, amino groups, nitrile groups, nitro groups or isocyanate groups, where the position of the divalent bonds does not include p–.

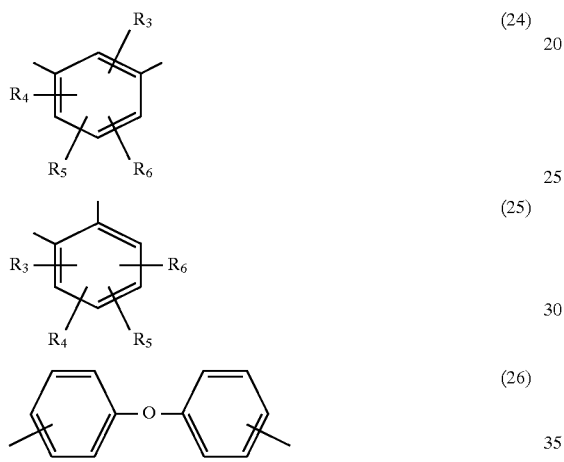

Furthermore, the fluorine-containing polyimide resin used in this invention preferably mainly contains the repeating unit expressed as the following Formulas (27)–(29).

In this invention, divalent organic groups expressed as the following formulas can be also used.

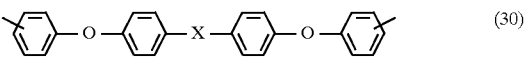 (30)

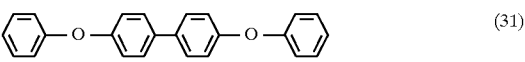 (31)

The fluorine-containing polyimide resin, that is used in this invention can contain the repeating unit expressed as the following formulas as its main component.

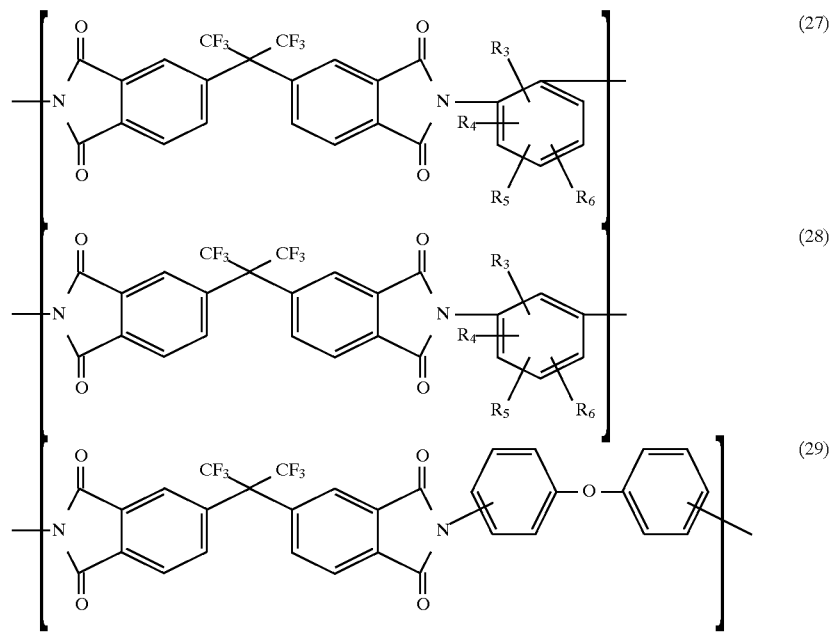

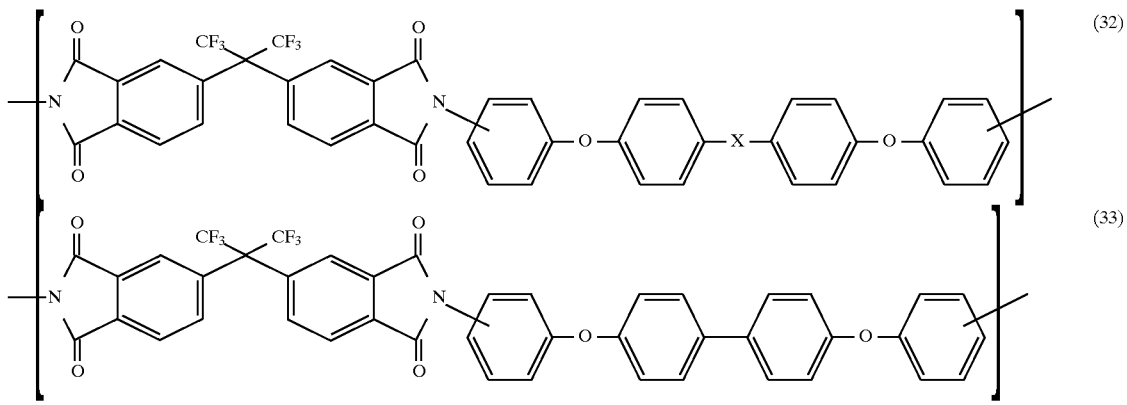

A serious problem is not caused if amic acid is partially maintained in all of the imide ring parts of the above formulas (21), (22), (27)–(29), (33) and (34) as long as the ratio is 30% or less. That is, the imide reacting rate should be at least 70%. This existence ratio is calculated by comparing the number of the remaining —COOH groups to the whole imide ring parts, using $^1$H-NMR. When the ratio is over 30%, lipophilicity between the organic solvent (A) and the solvent (C) is raised as —COOH increases. As a result, pin holes are formed and the separation ability of the fluorine-containing polyimide gas separation membrane is deteriorated.

The fluorine-containing polyimide resins can be used alone and they also can be mixed. Furthermore, it can be a copolymer or a mixture with polymers like polysulfone and polyethersulfone other than for a fluorine-containing polyimide resin. The percentage of the components, however, does not exceed 50%.

The fluorine-containing polyimide resin applied in the invention can be prepared with tetracarboxylic dianhydride and diamine component by a well-known polymerization method described in U.S. Pat. No. 3,959,350. For example, equimolar tetracarboxylic dianhydride and diamine are prepared, are stirred and mixed in a polar solvent at 80° C. or less, more preferably at from 0° to 60° C., and thus, polyamic acid is polymerized. The polar solvent is not limited; preferably, N-methyl pyrrolidone, pyridine, dimethyl acetamide, dimethyl formamide, dimethyl sulfoxide, tetramethyl urea, phenol, and cresol may also be applied as the polar solvent.

In the polyamic acid polar solution, a tertiary amine compound such as trimethyl amine, triethyl amine and pyridine; an imide reacting agent such as acetic anhydride, thionyl chloride, carbodiimide, or the like are added. The solution is then mixed and stirred at from 5° to 150° C., so that the imide reacting rate becomes at least 70%. According to another embodiment of the imide reaction, the polyamic acid solution may be heated at from 100° to 400° C., or more preferably, at from 120° to 300° C., without adding an imide reacting agent.

After the imide reaction, the polyimide, which has been dropped in a solvent like a large quantity of acetone, alcohol or water for refinement, is dehydrated to remove the polar solvent and imide reacting agent which are used for polymerization. The polyimide is dissolved again in the organic solvent (A) having a dielectric constant of at most 30 and a dipole moment of at most 3.0 D, in order to be used as a dope for film-forming.

When the imide reacting agent is not added, powder or solid of the polyamic acid is heated to from 100° to 400° C. for imide reaction. The polyamic acid powder is obtained by dropping the polyamic acid solution in a large quantity of a solvent like acetone or alcohol. The solid is obtained by evaporating the solvent from the polyamic acid solution. It is also possible to form polyamic acid powders by adding precipitant etc. at the evaporation and then filtering the powders. In any event, the polyamic acid is dissolved again in the organic solvent (A) having a dielectric constant of at most 30 and a dipole moment of at most 3.0 D or the organic solvent (B) which mainly comprising an organic solvent having at least one ether bonding in its molecular unit, then is used as a film-forming dope.

It is also possible to use the organic solvent (A) or (B) as the solvent for the purpose of synthesis. The characteristics of the element which uses the gas separation membrane is not influenced even if the imide reacting agent is not removed. Therefore, the dope adjustment process can be omitted.

The polyimide solution density is 3–40 weight % or preferably, 10–30 weight % when a film-forming dope is adjusted by re-dissolving in the organic solvent (A) or (B). Swelling agent, dispersing agent, thickner etc. also can be added if necessary.

The organic solvent (A) has a dielectric constant of at most 30 and a dipole moment of at most 3.0 D. The dielectric constant is preferably 10 or less. Since the polarity of the organic solvent (A) is small, lipophilicity with the solvent (C) used as a solidifying solution is weak. Therefore, the doping solution is leached into the solvent as a solidifying solution much slower than the skin layer is formed at the wet phase transversion film-forming. Thus film-forming on an industrial level is realized while pin holes are not formed on a large and uniform skin layer.

Although the organic solvent (A) is not limited as long as the above-mentioned condition is satisfied, diethylene glycol dimethyl ether (the dielectric constant is 5.97 and the dipole moment is 1.97 D) is preferred. In addition, 1,2-dimethoxyethane (the dielectric constant is 5.50 and the dipole moment is 1.79 D) is also taken as a preferable example. These are used alone or as a mixed solvent. An aprotic solvent having a dielectric constant of over 30 and/or dipole moment of over 3.0 D can be added to adjust the solubility of the fluorine-containing polyimide and the viscosity of the dope. The aprotic solvent should be 30 weight % or less. When the aprotic solvent is added, an organic solvent including diethylene glycol dimethyl ether of from 60 to 100 weight % is preferably used as the organic solvent (A) in this invention. For instance, a mixture of diethylene glycol dimethyl ether of 67 weight % and N-methyl pyrrolidone (NMP) of 30 weight % is taken as an example.

When a conventional aprotic polar solvent is used as a doping solvent, the dielectric constant is at least 32 and the dipole moment is at least 3.7 D. In other words, lipophilicity with the solidifying solvent (e.g. water) is strong. The aprotic polar solvents include N-methyl-2-pyrrolidone (the dielectric constant is 320 at 25° C. and the dipole moment is 4.00 D at 30° C.); N,N-dimethyl acetamide (the dielectric constant is 37.8 at 25° C. and the dipole moment is 3.72 D at 25° C.); N, N-dimethyl formamide (the dielectric constant is 36.7 at 25° C. and the dipole moment is 3.86 D at 25° C.); and dimethyl sulfoxide (the dielectric constant is 48.9 at 20° C. and the dipole moment is 4.30 at 20° C.). Due to this strong lipophilicity, the doping solvent leaches to the solidifying solvent faster than the skin layer is formed during the wet phase transversion film-forming. As a result, pin holes are formed in the large uniform skin layer. If this conventional aprotic polar solvent is used for the wet phase transversion film-forming, a dope for film-forming is cast or spun in a permeable supporter, and then it is left for a predetermined time at a predetermined temperature to partially evaporate the solvent. However, it absorbs the moisture in the air if the lipophilicity with water is too strong. Thus the surface becomes turbid and more pin holes are formed.

An organic solvent (B) of this invention should include mainly an organic solvent which has at least one ether bonding group in the molecular unit. The examples are diethylene glycol dimethyl ether; diethylene glycol diethyl ether; diethylene glycol dibuthyl ether; triethylene glycol diethyl ether; 1,2-diethoxyethane; 1,2-dimethoxyethane; and 1,2-dibutoxyethane. Diethylene glycol dimethyl ether, diethylene glycol diethyl ether or the mixture thereof is preferably used. These materials can be alone or as a mixture of plural kinds of solvent. Aprotic solvent having no ether bonding group in its molecular unit can be added in order to adjust the solubility of the fluorine-containing polyimide and the viscosity of the dope. The amount of the aproton solvent should be 30 weight % at most.

The wet phase transversion film-forming method using the dope is explained below. Although the film-forming method and the shape of the film are not limited in this invention, the asymmetric membrane becomes tubular (including hollow) or flat, by dipping the dope of the organic solvent (A) or (B) in the solidifying solvent (C) by extrusion or casting.

A flat membrane is obtained in the following steps:

coating the dope on the permeable supporter by casting or dipping;

dipping the dope in the solidifying solvent (C) so that an asymmetric membrane is obtained in a composite form. Therefore, the mechanical strength is improved. A glass plate having an even surface or a gas permeable supporter can be used for the supporter for this invention. The gas permeable supporting film includes an organic, inorganic or metallic porous material, woven cloth, nonwoven cloth, and the like. The thickness of the dope on the permeable supporter is from 25 to 400 $\mu$m or more preferably, from 30 to 200 $\mu$m.

The dope where the organic solvent (A) of this invention is used is formed at from −80° to 80° C., preferably, at from −20° to 40° C.

The solidifying solvent (C) is used to dip and remove the organic solvent (A). The solvent (C) is not limited if it is miscible with the solvent (A) while not dissolving the fluorine-containing polyimide resin. However, water, alcohols like methanol, ethanol, and isopropyl alcohol, or a mixture thereof can be used. Among them, water is preferably used. Although the temperature of the solidifying solvent (C) is not especially limited, the dipping-removal is preferably conducted at from 0° to 50° C.

A gas separation membrane is formed where the average thickness of the skin layer is from 1 to 100 nm in the area of 0.5 $m^2$ or more, by forming an asymmetric film in the above-mentioned condition. The thickness of the skin layer is substantially uniform and pin holes which deteriorate the separation ability are not formed over a large area. As a result, a large module can be manufactured, while the permeability of $CO_2$ gas is from 0.1 to 50 $Nm^3/m^2$/h/atm and the $CO_2$/methanol separation factor $\alpha$ is from 2 to 60.

It is further preferable that the gas separation membrane of this invention has a fluorine-containing polyimide membrane coated with elastomer polymer. The pin holes on the gas separation membrane are filled and the surface is hardly scratched if thin films of the elastomer polymer are laminated. The elastomer polymer is a kind of polymer that can form flexible films, which includes ethylene monomer, homopolymer or copolymer of conjugated diene monomer. The examples are polypropylene, poly(vinylchloride), ethylene-propylene copolymer, ethylene-propylene-diene copolymer, polybutadiene, polyisoprene, chloroprene rubber, poly(4-methyl-penten-1), i.e. methyl pentene resin, butadiene-styrene copolymer, isoprene-isobutylene copolymer, or polyisobutylene. In addition to the monomers, copolymers containing monomer components having functional groups like acrylonitrile, acrylate, methacrylate, acrylic acid, methacrylic acid, or copolymers having both of the soft and hard segments are also included. The example of the latter copolymers are polyether polyol, polyurethane polyether, polyurethane polyester, and polyamide polyether. Some other materials that are cured by a curing agent having straight and long chains are also used as the elastomer polymers. The examples are epoxy resin, ethyl cellulose, and butoxy resin.

A crosslinked silicone resin is especially preferred as the elastomer polymer in this invention. Such a crosslinked silicone resin is soluble in organic solvents before it is crosslinked. However, it does not dissolve in organic solvents after crosslinking. Such a silicone resin can be manufactured in a manner disclosed in Published Unexamined (Kokai) Japanese Patent Application No. Sho 59-225705.

The form of the element using the gas separation membrane is not limited. It will be a hollow element when it is extruded to be tubular. When it is coated on a proper supporter, it becomes spiral, flat, tubular, etc.

Figure 2:
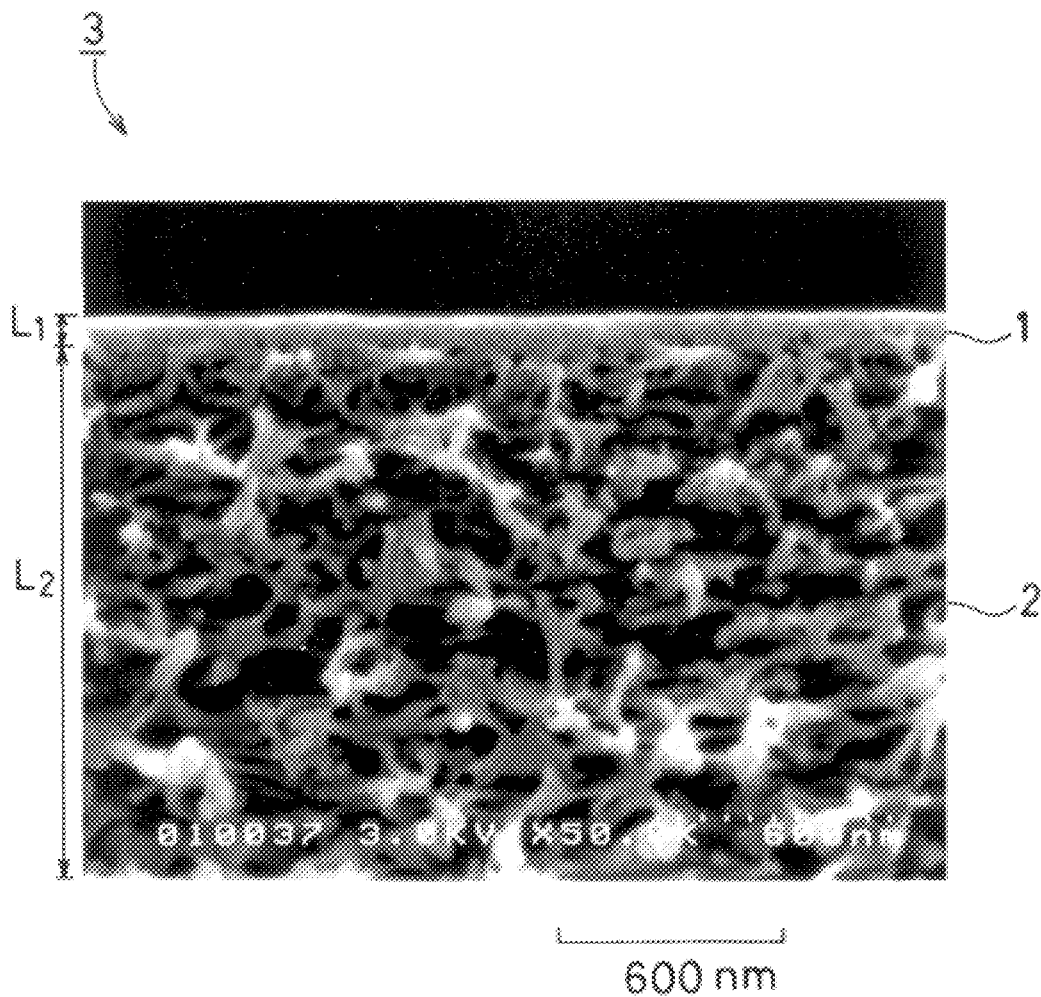
FIG. 2 is a trace of an enlarged cross-sectional SEM (scanning electron microscope) picture of FIG. 1.

FIG. 1 is a schematic cross-sectional view of a flat-type gas separation membrane 10 coated on a supporter of one embodiment of this invention. In FIG. 1, numeral 3 is a fluorine-containing polyimide resin layer comprising a skin layer 1 and a sponge like layer 2. The polyimide resin layer 3 is formed on a permeable supporter 4 of a polyester nonwoven cloth about 100 $\mu$m thick. FIG. 2 is a trace of an enlarged cross-sectional SEM picture to show the skin layer 1 and the sponge like layer 2 of FIG. 1. The thickness $L_1$ of the skin layer 1 is about 40 nm, and the thickness $L_2$ of the sponge like layer 2, which is partially shown in FIG. 2, is about 30 $\mu$m. In FIG. 2, the white part indicates polyimide resin and the black part indicates the shadow caused by void parts.

Figure 3A:
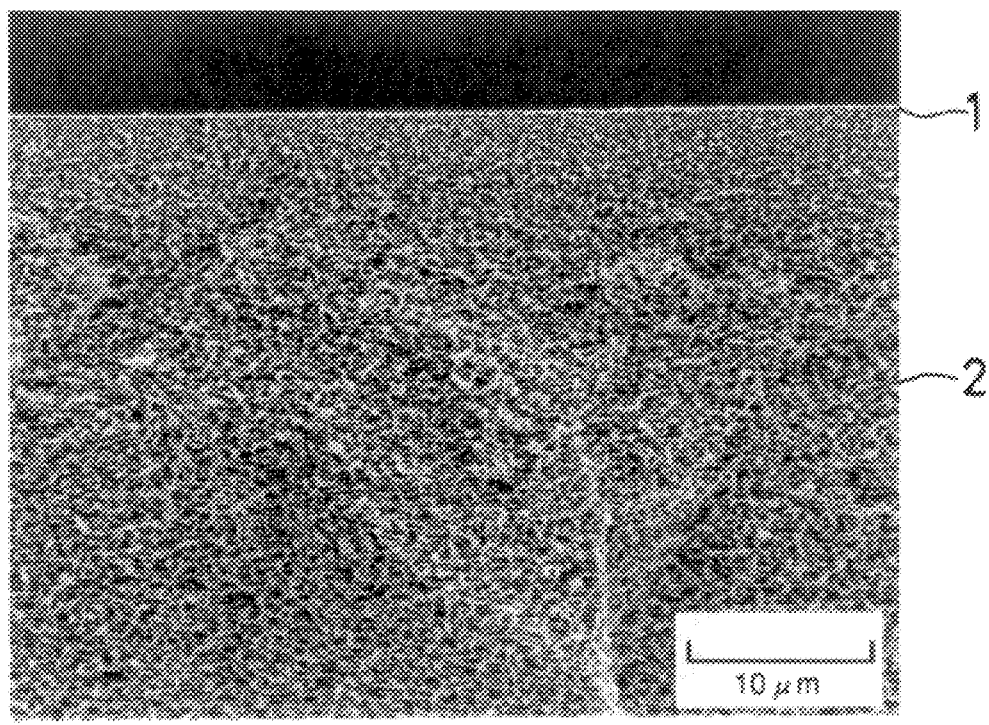
FIG. 3A and FIG. 3B are reduced pictures of FIG. 2.
Figure 3B:
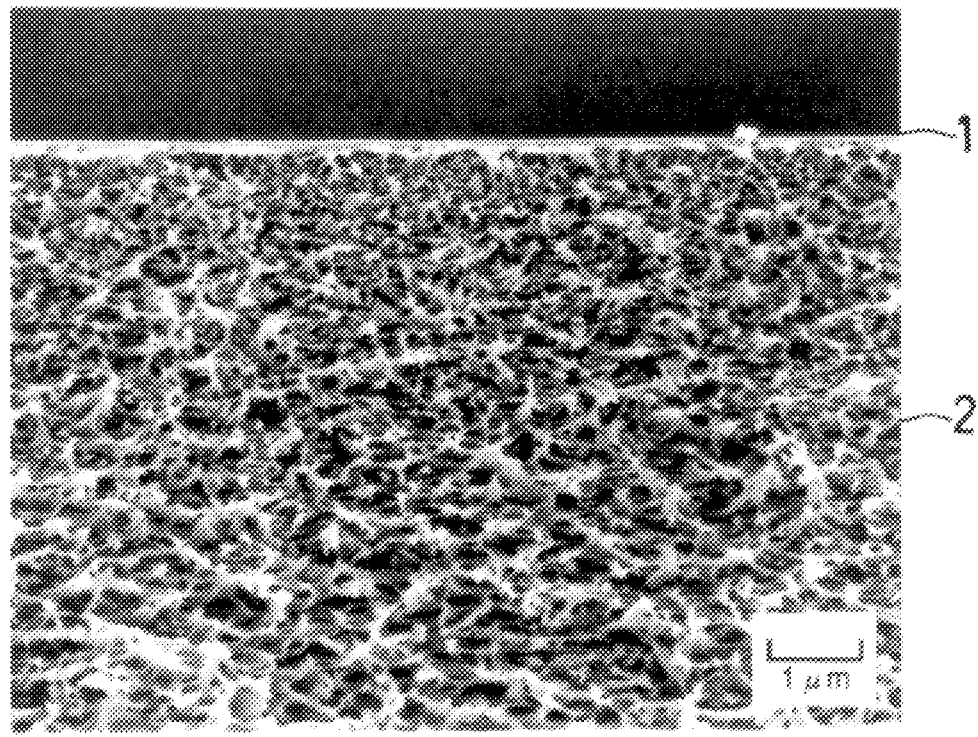

FIGS. 3A and 3B are reduced figures of FIG. 2, and they indicate that the structure of the sponge like layer 2 is comparatively uniform in the directions of thickness and across the surface.

Figure 4A:
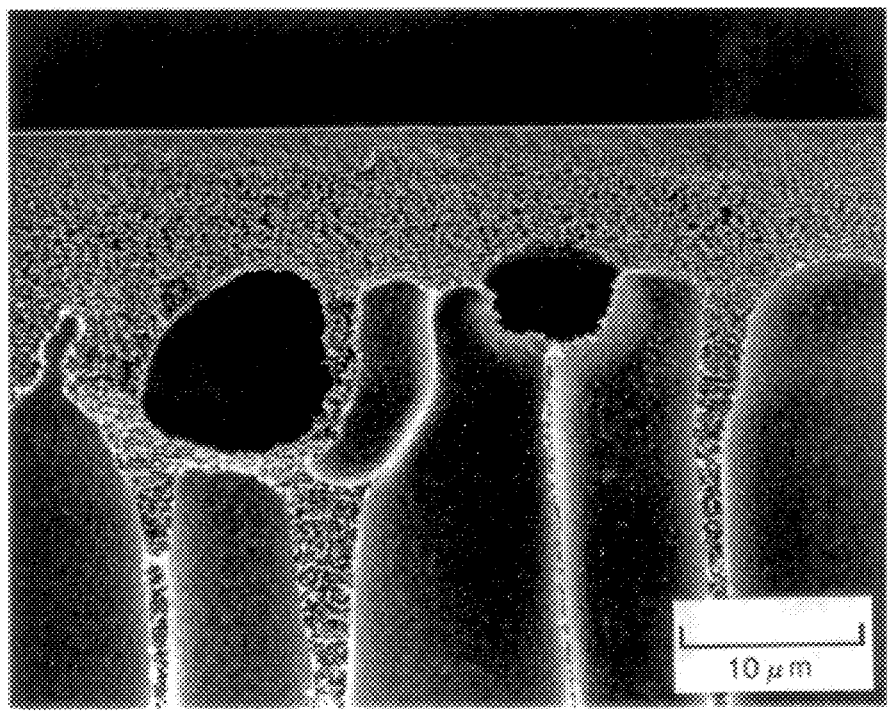
FIG. 4A is a trace of a cross-sectional SEM picture of a gas separation membrane comprising a conventional fluorine-containing polyimide resin layer.
Figure 4B:
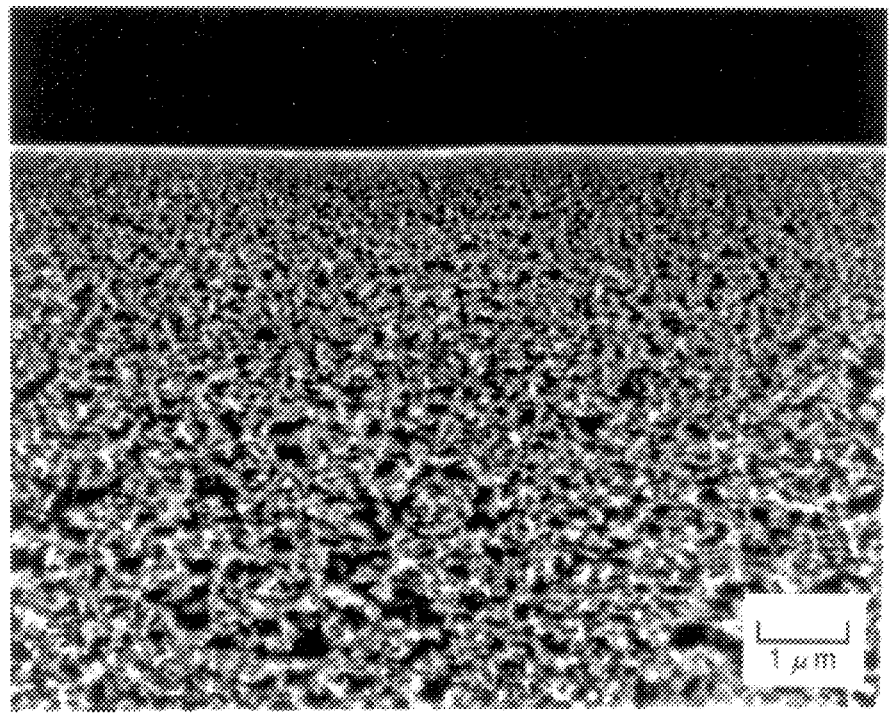
FIG. 4B is an enlarged view of the A part of FIG. 4A.

FIG. 4A is a trace of a cross-sectional SEM picture of a gas separation membrane comprising a conventional fluorine-containing polyimide resin layer. FIG. 4B is an enlarged view of part A of FIG. 4A. This asymmetrical membrane is formed by desolving in water, using N-methylpyrrolidone (NMP) as the solvent. In FIG. 4A, 21 is a skin layer, and 22 is a sponge like layer. Numeral 23 shows finger void parts formed longitudinally in the sponge like layer, and 24 shows other finger void parts formed transversely (in the direction of depth). FIG. 3A and FIG. 4A are enlarged at the same magnification. While the conventional asymmetrical membrane has finger void parts as large as about 10 μm in diameter, the membrane of this invention has a uniform sponge like layer free from finger void parts.

This invention will be explained in more detail referring to some Examples, although this invention is not limited to the range of the following Examples.

EXAMPLE 1

A fluorine-containing polyimide comprising a repeating unit expressed as Formula (21) was synthesized in the following manner using the solvent of diethylene glycol methyl ether:

dissolving 0.75 mol of bis[4-(4-aminophenoxy)phenyl] sulfone in 1842 g of diethylene glycol dimethyl ether as an organic solvent (A) or (B);

adding 0.75 mol of 5,5'-2,2,2-trifluoro-1-(trifluoromethyl)ethylidene-bis-1,3-isobenzofurandione (6 FDA) to the solvent under a nitrogen atmosphere;

stirring for eight hours at room temperature and conducting copolymerization in order to obtain polyamic acid;

adding 406 g of diethylene glycol dimethyl ether;

adding 2.25 mol of pyridine (imide reacting agent) and 2.25 mol of acid anhydride (imide reacting agent) after the solution becomes uniform; and stirring for twelve hours at a room temperature to conduct the imide reaction. After the reaction, the obtained solution was filtered as a film-forming solution, left for deaeration, and adjusted.

The film-forming solution was cast on a polyester nonwoven cloth (1 m wide, 15 m long, about 200 μm thick and the density is 85 g/m$^2$) to be 200 μm thick, by using an applicator at 25° C. And it was dipped in a water of 100 weight % (solidifying solution) of 20° C. for five minutes and then dipped in water of 20° C. for one hour. The asymmetric membrane shown in FIGS. 1–3 was formed in this manner. After that, a crosslinked silicone resin solution as elastomer polymer was coated on the obtained gas separation membrane, and heat-treated at 110° C. for fifteen minutes so that a membrane of elastomer polymer of about from 1 to 3 μm thick was formed and laminated. The crosslinked silicone resin solution was prepared by dissolving 3 weight % of a material named RTV615 (a product of GE silicones) in hexane.

The obtained gas separation membrane was made to be a cylindrical module (the effective membrane area is 1.4 m$^2$) to measure the permeation and the separation ability.

The measurement was carried out by using the following pure gases ($CO_2$, $CH_4$, and $N_2$) at 25° C. The permeation side was maintained to be atmospheric pressure. The result is shown in Table 1.

TABLE 1

| Gas (X) | Pressure of pressurizing side [Kgf/cm$^2$] | Permeability [Nm$^3$/m$^2$/h/atm] | Separation factor ($CO_2$/X) |
|---|---|---|---|
| $CO_2$ | 1 | $8.0 \times 10^{-2}$ | 1 |
| $CH_4$ | 1 | $5.3 \times 10^{-3}$ | 15 |
| $N_2$ | 1 | $8.0 \times 10^{-3}$ | 10 |

EXAMPLE 2

The same processes as in Example 1 were carried out, except that the diamine component was replaced by 3,3-diaminodiphenylsulfone. The results are shown in Table 2.

TABLE 2

| Gas (X) | pressure of pressurizing side [Kgf/cm$^2$] | Permeability [Nm$^3$/m$^2$/h/atm] | Separation factor ($CO_2$/X) |
|---|---|---|---|
| $CO_2$ | 1 | 0.1 | 1 |
| $CH_4$ | 1 | $5.3 \times 10^{-3}$ | 20 |
| $N_2$ | 1 | $8.0 \times 10^{-3}$ | 14 |

As mentioned above, the asymmetric membrane of this invention is large so that it can be applied to a practical module, and it has a uniform skin layer of from 1 to 100 nm thick. Therefore, the membrane of this invention is excellent in permeability and separation ability. In addition, the membrane is pinhole-free and homogeneous over a large area.

EXAMPLE 3

The gas separation membrane of Example 1 is fabricated to be a cylindrical module in order to measure the permeability and separation ability. The membrane was 0.33 m wide and 2.0 m long. The effective area of the module was 0.54 m$^2$. The result is shown in Table 3.

TABLE 3

| Gas (X) | pressure of pressurizing side [Kgf/cm$^2$] | Permeability [Nm$^3$/m$^2$/h/atm] | Separation factor ($CO_2$/X) |
|---|---|---|---|
| $CO_2$ | 1 | $3.2 \times 10^{-2}$ | 1 |
| $CH_4$ | 1 | $2.7 \times 10^{-3}$ | 20 |

It is clear from Table 3 that even a module having an effective area of 0.54 m$^2$ enjoys permeability and separation ability sufficient for a practical use.

EXAMPLE 4

A fluorine-containing polyimide having repeating unit expressed as Formula (23) was synthesized in the following manner using the solvent of diethylene glycol dimethyl ether:

dissolving 0.75 mol of 2,6-diamino toluene (2.6-DAT) in 1842 g of diethylene glycol dimethyl ether as an organic solvent (A) or (B);

adding 0.75 mol of 5,5'-2,2,2-trifluoro-1-(trifluoromethyl)ethylidene-bis-1,3-isobenzofurandione (6 FDA) to the solvent under a nitrogen atmosphere;

stirring for eight hours at room temperature and conducting copolymerization in order to obtain polyamic acid;

adding 406 g of diethylene glycol dimethyl ether;

adding 2.25 mol of pyridine (imide reacting agent) and 2.25 mol of acid anhydride (imide reacting agent) after the solution becomes uniform; and stirring for twelve hours at a room temperature to conduct the imide reaction. After the reaction, the obtained solution was filtered as a film-forming solution, left for deaeration, and adjusted.

The film-forming solution was cast on a polyester non-woven cloth (1 m wide, 15 m long, about 200 μm thick and the density is 85 g/m²) to be 200 μm thick, by using an applicator at 25° C. And it was dipped in a water of 100 weight % (solidifying solution) of 20° C. for five minutes and then dipped in water of 20° C. for one hour. The asymmetric membrane shown in FIGS. 1–3 was formed in this manner. After that, a crosslinked silicone resin solution as elastomer polymer was coated on the obtained gas separation membrane, and heat-treated at 110° C. for fifteen minutes so that a membrane of elastomer polymer of about from 1 to 3 μm thick was formed and laminated. The silicone resin solution was prepared in the same manner as shown in Example 1. The obtained gas separation membrane was made to be a cylindrical module (the effective membrane area is 1.4 m²) to measure the permeability and the separation ability. The measurement was carried out by using the following pure gases ($CO_2$, $CH_4$, and $N_2$) at 25° C. The permeation side was depressurized to $1 \times 10^{-2}$ torr. The result is shown in Table 4.

TABLE 4

| Gas (X) | pressure of pressurizing side [Kgf/cm²] | Permeability [Nm³/m²/h/atm] | Separation factor ($CO_2$/X) |
|---|---|---|---|
| $CO_2$ | 1 | $1.4 \times 10^{-1}$ | 1 |
| $CH_4$ | 1 | $3.1 \times 10^{-3}$ | 45 |
| $N_2$ | 1 | $480 \times 10^{-3}$ | 29 |

EXAMPLE 5

The same processes as in Example 4 were carried out, except that the diamine component was replaced by m-phenylendiamine. The results are shown in Table 5.

TABLE 5

| Gas (X) | pressure of pressurizing side [Kgf/cm²] | Permeability [Nm³/m²/h/atm] | Separation factor ($CO_2$/X) |
|---|---|---|---|
| $CO_2$ | 1 | $6.2 \times 10^{-2}$ | 1 |
| $CH_4$ | 1 | $3.0 \times 10^{-3}$ | 21 |
| $N_2$ | 1 | $3.9 \times 10^{-3}$ | 16 |

EXAMPLE 6

The same processes as in Example 4 were carried out, except that the divalent (diamine) component of the fluorine-containing polyimide having the repeating unit expressed as Formula (29) was replaced by 3,3'-oxydianiline. The results are shown in Table 6.

TABLE 6

| Gas (X) | pressure of pressurizing side [Kgf/cm²] | Permeability [Nm³/m²/h/atm] | Separation factor ($CO_2$/X) |
|---|---|---|---|
| $CO_2$ | 1 | $1.2 \times 10^{-1}$ | 1 |
| $CH_4$ | 1 | $67 \times 10^{-3}$ | 18 |
| $N_2$ | 1 | $1.0 \times 10^{-2}$ | 12 |

COMPARATIVE EXAMPLE 1

The same processes as in Example 4 were carried out, except that the diamine component was replaced by p-phenylendiamine. It was not dissolved in any solvent corresponding to the organic solvent (A) or (B).

COMPARATIVE EXAMPLE 2

The same processes as in Example 4 were carried out, except that the diamine component was replaced by 4,4'-oxydianiline. It was not dissolved in any solvent corresponding to the organic solvent (A) or (B).

EXAMPLE 7

The gas separation membrane of Example 4 was fabricated to be a cylindrical module to measure the permeability and separation ability. The membrane was 0.33 m wide and 2.0 m long. The effective area of the module was 0.54 m². The result is shown in Table 7.

TABLE 7

| Gas (X) | pressure of pressurizing side [Kgf/cm²] | Permeability [Nm³/m²/h/atm] | Separation factor ($CO_2$/X) |
|---|---|---|---|
| $CO_2$ | 1 | $5.4 \times 10^{-2}$ | 1 |
| $CH_4$ | 1 | $1.3 \times 10^{-3}$ | 42 |

It is clear from Table 7 that even a module having an effective area of 0.54 m² enjoys permeability and separation ability sufficient for a practical use.

EXAMPLE 8

A fluorine-containing polyimide having a repeating unit expressed as Formula (32) was synthesized in the following manner using the solvent of diethylene glycol dimethyl ether:

dissolving 0.75 mol of bis[4-(4-aminophenoxy)phenyl] propane in 1842 g of diethylene glycol dimethyl ether as an organic solvent (A) or (B);

adding 0.75 mol of 5,5'-2,2,2-trifluoro-1-(trifluoromethyl)ethylidene-bis-1,3-isobenzofurandione (6 FDA) to the solvent under a nitrogen atomosphere;

stirring for eight hours at room temperature and conducting copolymerization in order to obtain polyamic acid;

adding 406 g of diethylene glycol dimethyl ether;

adding 2.25 mol of pyridine (imide reacting agent) and 2.25 mol of acid anhydride (imide reacting agent) after the solution becomes uniform; and stirring for twelve hours at a room temperature to conduct the imide reaction. After the reaction, the obtained solution was filtered as a film-forming solution, left for deaeration, and adjusted.

The film-forming solution was cast on a polyester non-woven cloth (1 m wide, 15 m long, about 200 μm thick and the density is 85 g/m²) to be 200 μm thick, by using an applicator at 25° C. And it was dipped in a water of 100 weight % (solidifying solution) of 25° C. for five minutes and then dipped in water of 20° C. for one hour. The membrane was dried at 60° C. The asymmetric membrane shown in FIGS. 1–3 was formed in this manner. The obtained gas separation membrane was fabricated to be a cylindrical module (the effective membrane area is 1.4 m²) to measure the permeability and the separation ability. The measurement was carried out by using the following pure gases ($CO_2$, $CH_4$, and $N_2$) at 25° C. The permeation side was depressurized to $1 \times 10^{-2}$ torr. The result is shown in Table 8.

TABLE 8

| Gas (X) | pressure of pressurizing side [Kgf/cm$^2$] | Permeability [Nm$^3$/m$^2$/h/atm] | Separation factor (CO$_2$/X) |
|---|---|---|---|
| CO$_2$ | 1 | 0.08 | 1 |
| CH$_4$ | 1 | 5.0 × 10$^{-3}$ | 16 |
| N$_2$ | 1 | 0.01 | 8 |

EXAMPLE 9

A crosslinked silicone resin solution as elastomer polymer was coated on the gas separation membrane obtained in Example 8, and heat-treated at 110° C. for fifteen minutes so that a membrane of elastomer polymer is formed and laminated. The silicone resin solution was prepared in the same manner as shown in Example 1. After that, measurement was carried out under the same conditions as Example 1. The result is shown in Table 9.

TABLE 9

| Gas (X) | pressure of pressurizing side [Kgf/cm$^2$] | Permeability [Nm$^3$/m$^2$/h/atm] | Separation factor (CO$_2$/X) |
|---|---|---|---|
| CO$_2$ | 1 | 0.06 | 1 |
| CH$_4$ | 1 | 2.8 × 10$^{-3}$ | 21 |
| N$_2$ | 1 | 5.0 × 10$^{-3}$ | 12 |

COMPARATIVE EXAMPLE 3

The same processes as in Example 8 were carried out, except that the diamine component was replaced by 4,4'-oxydianiline, which has only one ether bonding. It was not dissolved in any solvent corresponding to the organic solvent (A) or (B). Thus, film-forming was not conducted successfully.

EXAMPLE 10

The gas separation membrane of Example 8 was fabricated to be a cylindrical module to measure the permeability and separation ability. The membrane was 0.33 m wide and 2.0 m long. The effective area of the module was 0.54 m$^2$. The result is shown in Table 10.

TABLE 10

| Gas (X) | pressure of pressurizing side [Kgf/cm$^2$] | Permeability [Nm$^3$/m$^2$/h/atm] | Separation factor (CO$_2$/X) |
|---|---|---|---|
| CO$_2$ | 1 | 3.1 × 10$^{-2}$ | 1 |
| CH$_4$ | 1 | 2.1 × 10$^{-3}$ | 15 |

It is clear from Table 10 that even a module having an effective area of 0.54 m$^2$ enjoys permeability and separation ability sufficient for a practical use.

As mentioned above, the asymmetric membrane of this invention is large so that it can be applied as a practical module, and it has a uniform skin layer of from 1 to 100 nm thick. Therefore, the membrane of this invention is excellent in permeability and separation ability. In addition, the membrane is pinhole-free and homogeneous over a large area.

As mentioned above, this invention can provide a fluorine-containing polyimide gas separation membrane which is uniform over a large area, free from problems including pin holes. Thus, the fluorine-containing polyimide gas separation membrane has a high permeability and a high separation factor α.

In addition to that, this invention can provide a simple method to manufacture a gas separation membrane which has a high permeability and satisfies the cost efficiency.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A fluorine-containing polyimide gas separation membrane, comprising a sponge-like layer of solvent-soluble fluorine-containing polyimide resin and a skin layer on the sponge-like layer, the membrane being at least 0.5 m$^2$ in area, the skin layer having an average thickness ranging from 1 to 100 nm, the permeability of the membrane for CO$_2$ gas ranging from 0.01 to 50 Nm$^3$/m$^2$/h/atm, the separation factor α for the membrane for CO$_2$/methane ranging from 15–60, the sponge-like layer being free from void parts having a diameter of more than one micron.

2. The fluorine-containing polyimide gas separation membrane according to claim 1, which is in the shape of a tube membrane, a hollow membrane, or a membrane formed on a gas permeable supporter.

3. The fluorine-containing polyimide gas separation membrane according to claim 1, wherein the solvent-soluble fluorine-containing polyimide resin is at least a resin selected from fluorine-containing polyimide resins having at least three fluorine atoms and at least one —SO$_2$— part in the repeating molecular unit which composes the polyimide resin layer.

4. The fluorine-containing polyimide gas separation membrane according to claim 1, which has at least one —CF$_3$ group in the repeating molecular unit which composes the fluorine-containing polyimide resin.

5. The fluorine-containing polyimide gas separation membrane according to claim 1, wherein the main component of the fluorine-containing polyimide resin is substantially the repeating unit expressed as at least one formula selected from the group consisting of Formulas (2), (3), (4), (5), (6), (7) and (8):

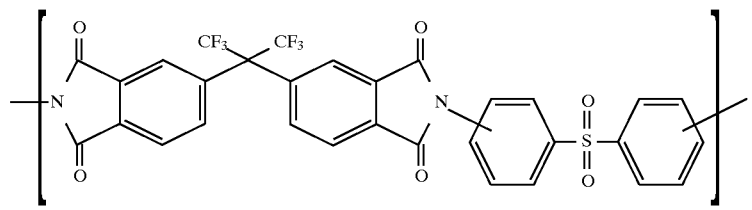

(2)

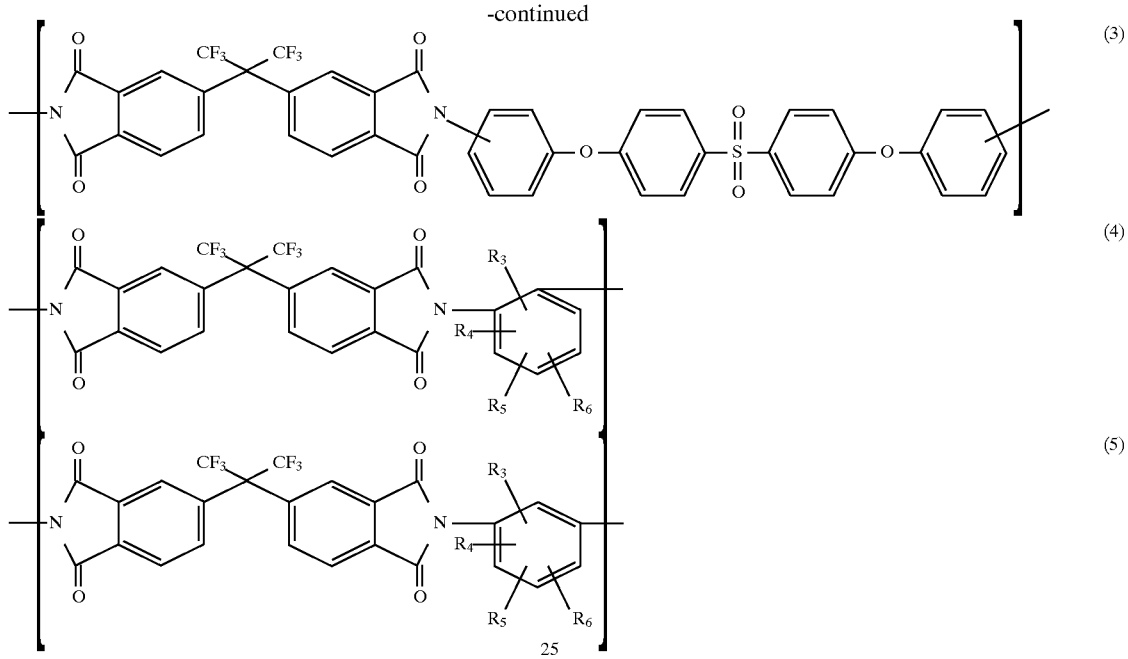

where $R_3-R_6$ indicate hydrogen, hydrocarbon groups having from one to four carbons, halogen, hydroxyl groups, carboxylic acid groups, carboxylic acid ion groups, sulfonic groups, sulfonic ion groups, amino groups, nitrile groups, nitro groups, or isocyanate groups;

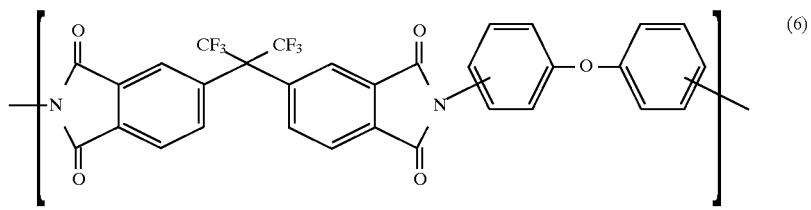

where the bonding position of the benzene ring is either ortho position or meta position;

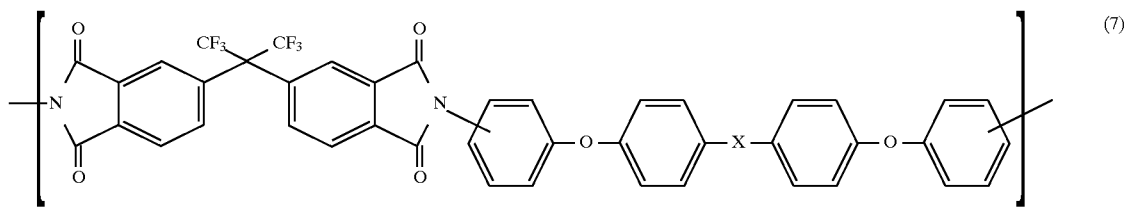

where X indicates

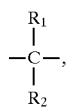

and $R_1$ and $R_2$ represent hydrogen or hydrocarbon groups from one to four carbons

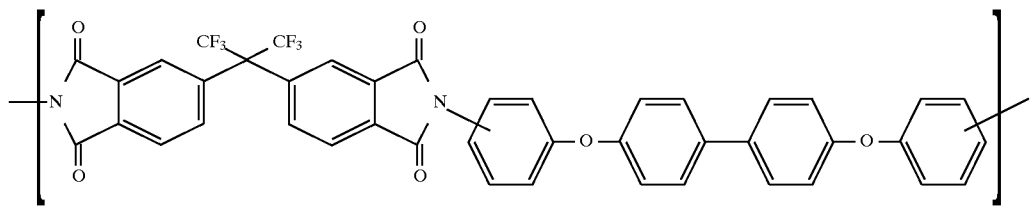

6. The fluorine-containing polyimide gas separation membrane according to claim 1, further comprising a protective film of elastomer polymer.

7. The fluorine-containing polyimide gas separation membrane according to claim 6, said protective film of elastomer polymer is a membrane of crosslinked silicone resin.

8. The fluorine-containing polyimide gas separation membrane according to claim 1, wherein the fluorine-containing polyimide resin thereof mainly comprises a repeating unit shown in Formula (1), where $A_1$–$A_n$ indicate at least one tetravalent organic group selected from the group consisting of aromatic, aliphatic and alicyclic hydrocarbon groups, $R_1$–$R_n$ indicate divalent aromatic, aliphatic or alicyclic hydrocarbon groups or a divalent organic group of these hydrocarbon groups bonded by a divalent organic bonding group, and at least one of the organic groups of said $A_1$–$A_n$ is an organic group having at least three fluorine atoms while at least one of said organic groups of $R_1$–$R_n$ indicate either —$SO_2$—, a divalent organic group located in ortho position or meta position, or at least two ether bonding groups, where $n_1, n_2 \ldots n_x$ indicate the composition ratio of the repeating unit and $n_1+n_2 \ldots +n_x=1$ 9. A method of manufacturing a fluorine-containing polyimide gas separation membrane that comprises a sponge-like layer of solvent-soluble fluorine-containing polyimide resin and a skin layer formed thereon, the method comprising:

dissolving the polyimide resin in a first solvent comprising as a main component at least one selected from the group consisting of diethylene glycol dimethyl ether, diethylene glycol diethyl ether and mixtures thereof; and desolvating the polyimide resin by exposing the dissolved polyimide resin to a second solvent (C) that dissolves in the first solvent but does not dissolve the fluorine-containing polyimide resin.

10. The method of manufacturing a fluorine-containing polyamide gas separation membrane according to claim 9, wherein the solvent (C) is at least one solution selected from the group consisting of water, alcohols and the mixed solvent thereof.

11. The method of manufacturing a fluorine-containing polyimide gas separation membrane according to claim 9, wherein the gas separation membrane is at least one membrane selected from the group consisting of tubular membrane, hollow membrane or a membrane formed on a gas permeable supporter.

12. The method of manufacturing a fluorine-containing polyimide gas separation membrane according to claim 9, wherein the solvent-soluble fluorine-containing polyimide resin is at least one resin selected from the group consisting of fluorine-containing polyimide resins having at least three fluorine atoms and at least one —$SO_2$— part in the repeating molecular unit composing the polyimide resin layer.

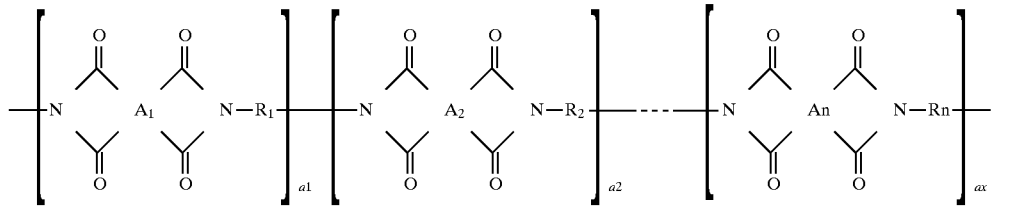

13. The method of manufacturing a fluorine-containing polyimide gas separation membrane according to claim 9, wherein the repeating molecular unit composing the fluorine-containing polyimide resin comprises at least one —$CF_3$ group.

14. The method of manufacturing a fluorine-containing polyimide gas separation membrane according to claim 9, wherein the fluorine-containing polyimide resin mainly contains a repeating unit expressed as at least one formula selected from the following formulas:

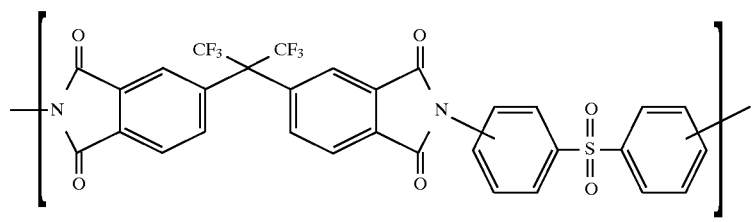

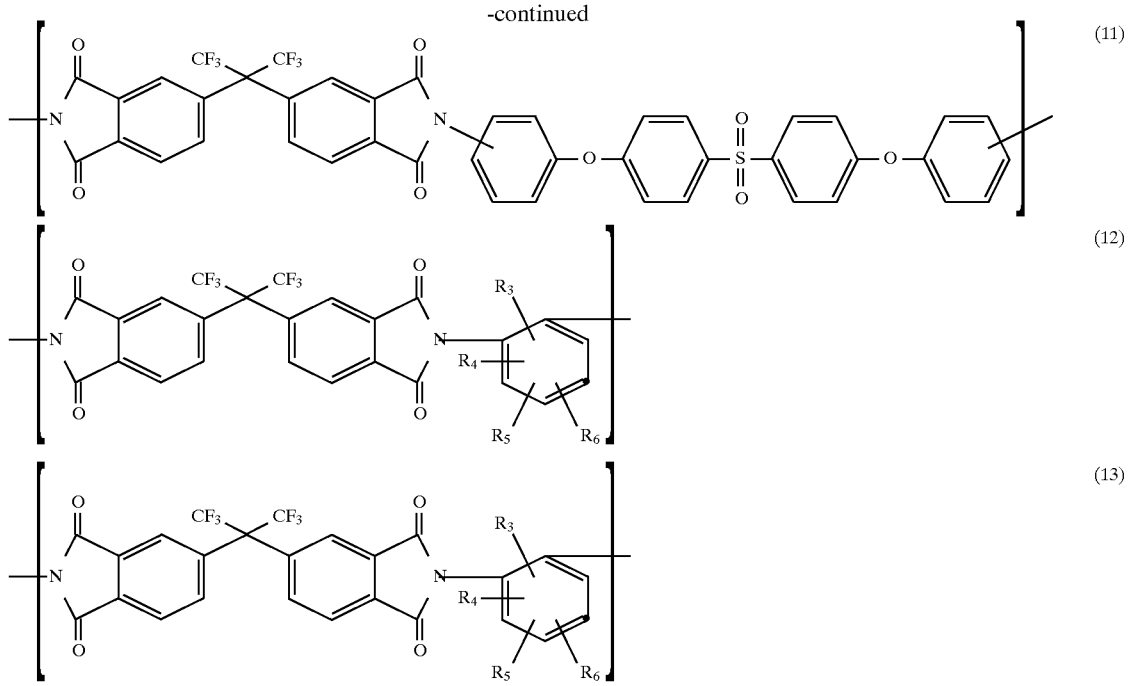

where $R_3$–$R_6$ indicate hydrogen, hydrocarbon groups having from one to four carbons, halogen, hydroxyl groups, carboxylic acid groups, carboxylic acid ion groups, sulfonic groups, sulfonic ion groups, amino groups, nitrile groups, nitro groups, or isocyanate groups;

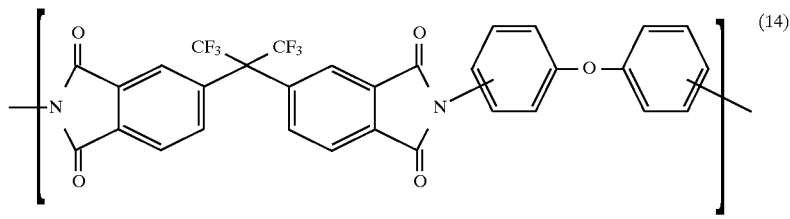

where the bonding position of the benzene ring is either ortho position or meta position;

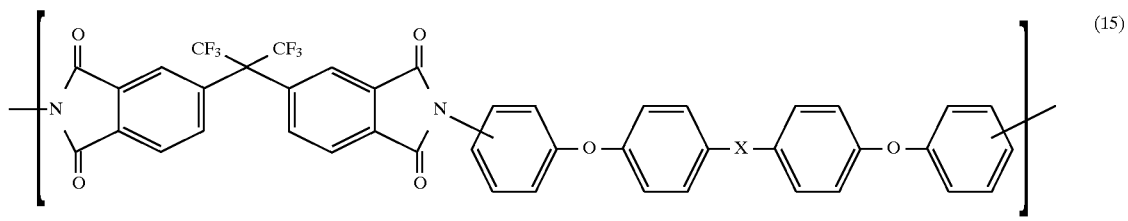

where X indicates

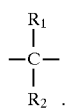

$R_1$ and R2 represent hydrogen or hydrocarbon groups having from one to four carbons

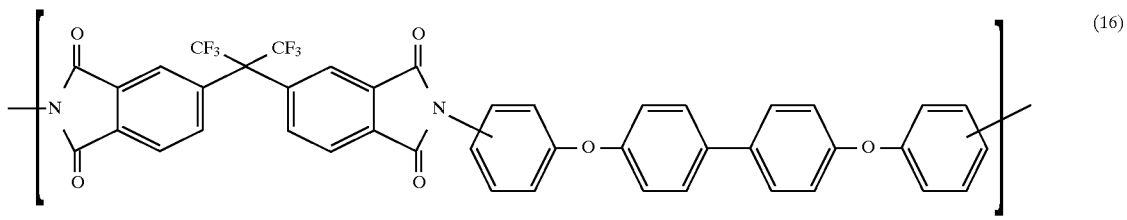
(16)

15. The method of manufacturing a fluorine-containing polyimide gas separation membrane according to claim 9, wherein the sponge like layer has no void parts of more than 1 μm in diameter.

16. The method of manufacturing a fluorine-containing polyimide gas separation membrane according to claim 9, wherein a protective film of elastomer polymer is further formed on the fluorine-containing polyimide gas separation membrane.

17. The method of manufacturing a fluorine-containing polyimide gas separation membrane according to claim 16, wherein the protective film of elastomer polymer is prepared by crosslinking a croslinked silicone resin.

18. The method of manufacturing a fluorine-containing polyimide gas separation membrane according to claim 9, wherein the fluorine-containing polyimide resin contains mainly the repeating unit substantially expressed as Formula (9), where $A_1$–$A_n$ indicate at least one tetravalent organic group selected from the group consisting of aromatic, alicyclic and aliphatic hydrocarbon groups, $R_1$–$R_n$ indicate divalent aromatic, alicyclic or aliphatic hydrocarbon groups or a divalent group where said hydrocarbon groups are bonded by divalent organic groups; at least one organic group of said $A_1$–$A_n$ is an organic group having at least three fluorine atoms, and at least one organic group of $R_1$–$R_n$ is at least one group selected from the groups consisting of —$SO_2$— bonding groups, divalent organic groups at ortho position or meta position, and at least two ether bonding groups, where $n_1$, $n_2$ ... $n_x$ indicate the composition ratio of the repeating unit and $n_1+n_2+ \ldots +n_x=1$

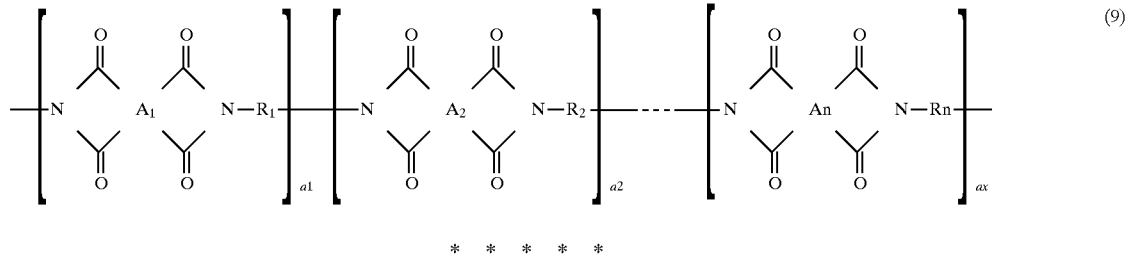
(9)

* * * * *